F. M. DIXON.
TABLE FORKS FOR GREEN-CORN, &c.

No. 187,363. Patented Feb. 13, 1877.

Witnesses:
Benj Morrison
R. Heber Peter

Inventor:
Franklin M. Dixon

UNITED STATES PATENT OFFICE

FRANKLIN M. DIXON, OF PHILADELPHIA, PENNSYLVANIA.

IMPROVEMENT IN TABLE-FORKS FOR GREEN CORN, &c.

Specification forming part of Letters Patent No. 187,363, dated February 13, 1877; application filed August 28, 1876.

*To all whom it may concern:*

Be it known that I, FRANKLIN M. DIXON, of the city of Philadelphia, in the State of Pennsylvania, have invented a new and useful Fork for Table Use, which fork is fully set forth and described in the following specification, reference being had to the accompanying drawings, in which—

Figure 1:
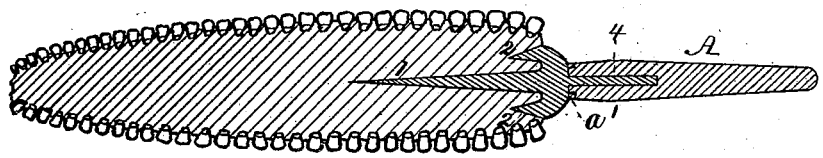
Figure 2:
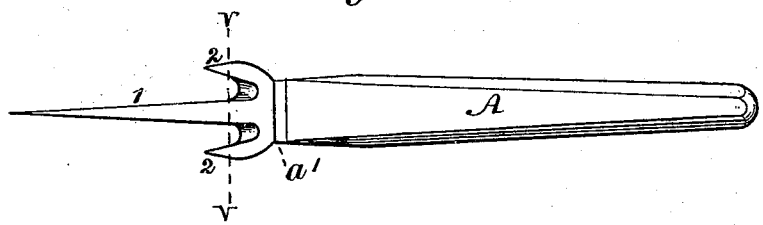
Figure 3:
Figure 4:
Figure 5:

Figure 1 is a central longitudinal section of the said fork applied to the purpose intended; Fig. 2, a side view of the said fork; Fig. 3, an edge view of the same; Fig. 4, a transverse section taken on the line *v v* of Fig. 2; and Fig. 5, a like transverse section, showing a modification in the form of the longer point.

The object of my invention is to afford a convenient fork, whereby an ear of hot cooked Indian corn can be easily held while one is biting the grains off with his teeth, or cutting them off with a knife, without soiling or burning his fingers; and my said invention consists of a fork having one long tine projecting taperingly to a sharp point in alignment with a straight handle, and at two opposite sides of the base of the said long tine two short tines, each tapered to a sharp point in the same direction as that of the long tine, substantially as represented by Figs. 2 and 3, a transverse section of said tines, taken on the dotted line *v v* of Fig. 2, being shown in Fig. 4 in connection with the handle.

The handle A is made of ivory or bone, and may be made of horn, gutta-percha, wood, or any suitable material, and about three and a half or four inches long, and with a metallic collar, *a'*, around its upper end. The tines 1 2 2 and their base are made of steel, properly tempered and polished, and with a shank, 4, (see Fig. 1,) whereby the tines, united at their bases as one piece with the shank, are firmly fixed in the connecting end of the handle A. The tines 1 2 2 are rectangular in cross-section for the purpose, mainly, of affording strength against lateral pressure; but the long one, 1, as a modification, may be made lancet-shaped, as shown in cross-section in Fig. 5, and thus afford two side edges for slicing or scoring the tops of the grains when desired.

The application of the fork just described is shown in Fig. 1, the tine 1 of the forked end thereof being forced into the center or pith, and the tines 2 2 into the harder part of the butt-end of the ear of corn, and thus enabling the latter to be held by the handle A of the implement without requiring the holder to touch the ear of corn with the fingers, a napkin being used in holding the hot ear of corn while the tines of the fork are being thrust into the latter.

It will be readily seen that this fork will be a very desirable one for the purpose specified.

I claim as my invention—

The fork herein described, the same consisting of the longer tine 1, projecting taperingly to a sharp point in alignment with the straight handle A, and of the two shorter tines 2 2, each tapered to a sharp point in the same direction as that of the longer tine 1, substantially as and for the purpose hereinbefore set forth.

FRANKLIN M. DIXON.

Witnesses:
BENJ. MORISON,
R. HEBER ALTER.